Apr. 3, 1923.
C. H. RANDOLPH
1,450,868
ELEMENTARY MUSIC NOTATION DEVICE
Filed Oct. 7, 1921
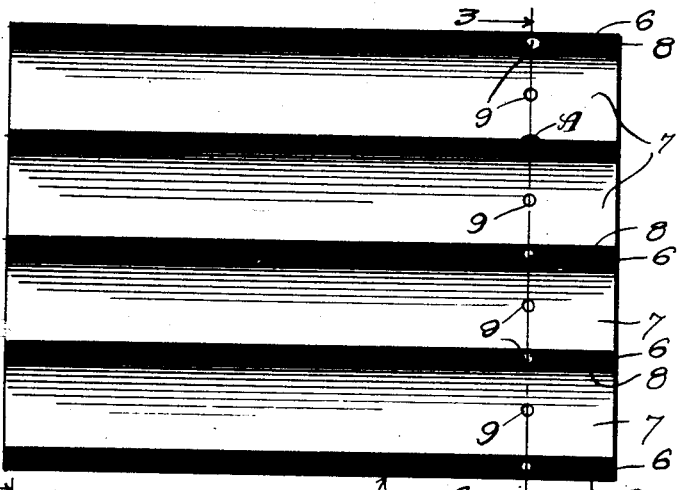
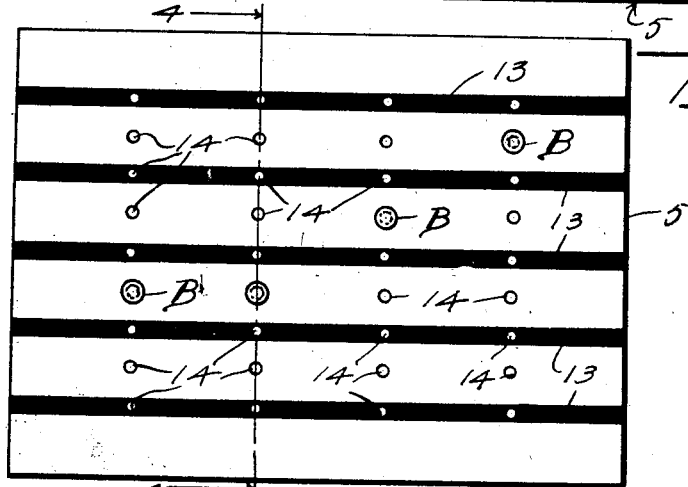
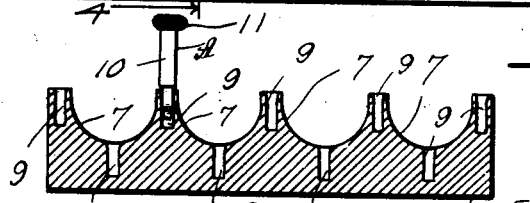
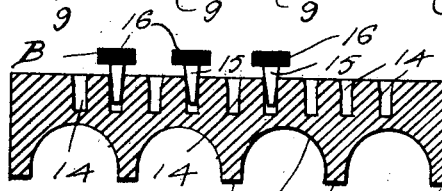
Inventor
Cary H. Randolph.
By
Attorney Patented Apr. 3, 1923.

1,450,868

UNITED STATES PATENT OFFICE.

CARY H. RANDOLPH, OF ST. LOUIS, MISSOURI.

ELEMENTARY-MUSIC-NOTATION DEVICE.

Application filed October 7, 1921. Serial No. 506,186.

*To all whom it may concern:*

Be it known that I, CARY H. RANDOLPH, a citizen of the United States, residing at St. Louis, in the city of St. Louis and State of Missouri, have invented certain new and useful Improvements in Elementary-Music-Notation Devices; and I do hereby declare the following to be a full, clear, and exact description of the invention, such as will enable others skilled in the art to which it appertains to make and use the same.

This invention relates to an elementary music notation device.

One important object is to provide a means to facilitate the instruction in music to enable a beginner to read notes within a minimum period of time and to particularly emphasize the spaces as well as lines of the staff, and a means whereby the sight may be supplemented by the touch.

Another object is to provide means whereby the objection to the use of a black board or other means containing music notations in colors reverse to those of sheet music may be overcome to avoid confusion to the student.

A further object is to provide a device of this character having representations of the lines of a music staff and separable note symbols applicable thereto.

Still another object is to provide a device of this kind having means to represent the lines of a music staff and valleys or other means intermediate said lines to represent spaces in order to facilitate an impression of the importance thereof on the mind of the student.

Additional objects and advantages will become apparent from a consideration of the description following taken in connection with accompanying drawings, illustrating one practical embodiment.

In said drawings:—

Figure 1 is a plan view of one face of the device;

Figure 2 is a plan view of the opposite face of the device; and

Figures 3 and 4 are cross sectional views on the lines 3—3 and 4—4 of Figure 1 and 2 respectively.

Like reference characters designate like or similar parts in the views.

In reducing the invention to practice, a block or base 5 is provided which may be made of wood or any other suitable material and of any desired size or shape, preferably rectangular as shown.

On one face of the base 5 a plurality of ridges 6 are provided having grooves or depressions 7 intermediate them. The upper edges of the ribs 6 designate the lines of a music staff and to this end are preferably colored black as at 8 while the walls of the depressions 7 are colored white. Suitable recesses or openings 9 are provided at the bases of the grooves 7 and in the ribs 8 so as to selectively receive a note symbol generally designated A. Said symbol A may have a stem 10 insertable selectively into the openings or recesses 9 and adapted to remain therein by frictional engagement with the walls of the recess but detachable. This symbol A has a head 11, which may be round or of any other desired shape and which is preferably colored red to contrast with the ribs 6. The child or beginner may place the symbol A in any of the recesses 9 according to the lesson or instructions. Said walls of the depressions are on a continuous curve between their respective ridges so as to offer no obstruction to passage of the finger of the pupil thereover whereby distraction of the attention of the pupil is consequently avoided. The depressions enable the child to touch the spaces in such a way as to contrast them with flat surfaces or lines 8. The head 11 may be colored black of course, but as it is used usually by small children, it is preferably colored red in view of the fact that such color more readily fascinates and attracts the attention of children. The stem 10 may be colored white.

The opposite surface of the base 5 is flat and has delineated thereon as at 13, the lines of a music staff. Said lines are relatively wide and preferably black while the spaces intermediate and adjacent the same are preferably white. This side of the base is to be used after the student has learned the importance and value of the spaces by use of the reverse side of the device in connection with the symbol A. This flat side of the base has a plurality of rows of recesses 14 adapted to receive note symbols B, structurally similar to the note symbols A, thus having stems 15 insertable into the recesses 14 and heads 16 thereon. Stems 15 are preferably colored white while the heads 16 are preferably colored black to accord with the color of notes on sheet music. By the use of this flat surface and symbols B the student according to instructions or the lessons may apply the symbols B to appropriate recesses 14 to represent a measure.

As the recesses 9 and 14 and the stems of the note symbols are round in cross section, such note symbols may be more readily applied to the recesses than non-circular as will be understood.

Attention is called to the fact that the device overcomes the use of a black board in the instruction of music as each student may have one of the devices for individual use, thus each student may individually follow a lesson as contrasted with one student following a lesson on the black board and the others watching him. In addition, on a black board the lines are white rather than black and also the note representations are white instead of black. This is the reverse of a music sheet and I find that by the use of my device, considerable confusion is avoided which results from the difference or reverse colors used incidental to black board instruction.

The heads 11 and 16 so contrast with the lines and spaces that the teacher, even from a distance may determine the correctness of the lesson work of a pupil.

It is understood of course that but a single adaptation of the invention has been illustrated and described in view of which fact changes within the spirit and scope may be made. It will further be manifest that the device is capable of varied use and is not to be limited to the use suggested.

What is claimed is:—

1. An integral block for the purpose specified having portions provided with curved surfaces separated by substantially flat portions, the curved surfaces and flat portions extending in the same direction, the curved surfaces representing the spaces of the staff and the flat portions representing the lines of the staff, a note representing means, and means in the first portions and flattened portions to support said note representing means.

2. A block for the purpose specified having portions provided with curved surfaces separated by substantially flat portions, the curved surfaces and flat portions extending in the same direction, the curved surfaces representing the spaces of the staff and the flat portions representing the lines of the staff, the block having recesses in the flat portions and curved surfaces, a note representing means having a stem for removable disposition in any of said recesses.

3. An integral block formed to represent the musical staff, the block having spaced portions with substantially flat surfaces to represent lines and intermediate portions with curved surfaces to represent spaces, said substantially flat surfaces and curved surfaces extending in the same direction, and means in said portions to support note-representing means.

4. An integral block formed to represent the musical staff, the block having spaced portions with substantially flat surfaces to represent lines and intermediate portions with curved surfaces to represent spaces, said substantially flat surfaces and curved surfaces extending in the same direction means in the portions having flat surfaces for supporting note representing means and means in the portions having curved surfaces for supporting note representing means.

In testimony whereof I affix my signature in presence of two witnesses.

CARY H. RANDOLPH.

Witnesses:
  A. F. SPANGENBERG,
  S. WASHINGTON.